(12) United States Patent
Futaki

(10) Patent No.: US 11,381,983 B2
(45) Date of Patent: Jul. 5, 2022

(54) BASE STATION, RADIO TERMINAL, AND METHODS THEREIN

(71) Applicant: NEC CORPORATION, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/851,932

(22) Filed: Apr. 17, 2020

(65) Prior Publication Data

US 2020/0245161 A1 Jul. 30, 2020

Related U.S. Application Data

(63) Continuation of application No. 15/757,432, filed as application No. PCT/JP2016/004157 on Sep. 13, 2016, now Pat. No. 10,667,146.

(30) Foreign Application Priority Data

Nov. 5, 2015 (JP) .................................. 2015-217963

(51) Int. Cl.
*H04W 24/02* (2009.01)
*H04W 28/06* (2009.01)
(Continued)

(52) U.S. Cl.
CPC ........... *H04W 24/02* (2013.01); *H04W 28/04* (2013.01); *H04W 28/06* (2013.01); *H04W 48/08* (2013.01); *H04W 74/0833* (2013.01)

(58) Field of Classification Search
CPC . H04W 74/0833; H04W 24/02; H04W 48/08; H04W 28/06; H04W 28/04
(Continued)

(56) References Cited

U.S. PATENT DOCUMENTS 10,070,464 B2 9/2018 Tang
10,143,013 B2* 11/2018 Priyanto ............... H04W 72/04
(Continued)

FOREIGN PATENT DOCUMENTS

CN 103139890 A 6/2013
CN 104521307 A 4/2015
(Continued)

OTHER PUBLICATIONS

Fujitsu, "Further Considerations of SI for MTC Low Cost and Enhanced Coverage", R2- 152190, 3GPP TSG-RAN WG2 Meeting #90, May 25-29, 2015, pp. 1-4.
(Continued)

*Primary Examiner* — Rownak Islam
(74) *Attorney, Agent, or Firm* — Sughrue Mion, PLLC

(57) ABSTRACT

A radio terminal (1) receives from a base station (2) a first value (601) of a first radio resource configuration information element. The first value (601) is associated with normal coverage or with a first coverage enhancement level. The radio terminal (1) derives a second value (604) of the first radio resource configuration information element by converting (603) the first value (601) using a value of a conversion factor (602). The second value (604) is associated with a second coverage enhancement level. It is thus, for example, possible to contribute to reduction of data size necessary for the base station to notify the radio terminal of a plurality of radio resource configurations for a plurality of coverage enhancement levels.

6 Claims, 9 Drawing Sheets

(51) Int. Cl.
 *H04W 48/08* (2009.01)
 *H04W 28/04* (2009.01)
 *H04W 74/08* (2009.01)
(58) Field of Classification Search
 USPC .......................................................... 370/329
 See application file for complete search history.

(56) References Cited

U.S. PATENT DOCUMENTS

| | | | |
|---|---|---|---|
| 2014/0098761 | A1 | 4/2014 | Lee |
| 2015/0271686 | A1 | 9/2015 | Jha et al. |
| 2016/0150570 | A1 | 5/2016 | Wang |
| 2016/0330768 | A1 | 11/2016 | Hu |
| 2017/0041960 | A1 | 2/2017 | Quan |
| 2017/0374689 | A1 | 12/2017 | Liu |
| 2018/0063722 | A1* | 3/2018 | Lee .......................... H04L 1/08 |
| 2018/0262989 | A1* | 9/2018 | Wu .................... H04W 52/0216 |

FOREIGN PATENT DOCUMENTS

| | | |
|---|---|---|
| CN | 104619025 A | 5/2015 |
| CN | 104704884 A | 6/2015 |
| EP | 2 903 378 A1 | 8/2015 |
| WO | 2014/110513 A1 | 7/2014 |
| WO | 2015-005701 A1 | 1/2015 |
| WO | 2015/021315 A1 | 2/2015 |
| WO | 2015/116732 A1 | 8/2015 |
| WO | 2015/142239 A1 | 9/2015 |

OTHER PUBLICATIONS

Communication dated Jun. 18, 2020 by the European Patent Office in application No. 20165058.7.
Ericsson, "Remaining issues on random access for Rel-13 low complexity and enhanced coverage UEs", 3GPP TSG-RAN WG2 #91 bis Tdoc R2-154788, Malmo. Sweden, Oct. 5-9, 2015, 8 pages total.
"3rd Generation Partnership Project; Techinical Specification Group Radio Access Network; Study on provision of low-cost Machine-Type Communications (MTC) User Equipments (UEs) based on LTE Release 12)", 3GPP TR 36.888 V12.0.0, Jun. 2013.
"Bundling paging messages, CE capability and UE behaviour", Ericsson, 3GPP TSG-RAN WG2 #91 bis R2-154789, Oct. 5-9, 2015.
Catt, "Consideration on random access for R13 eMTC", 3GPP TSG RAN WG2 Meeting #91 bis R2-154082, Malmo, Sweden, Oct. 5-9, 2015, 6 pages total.
"Way Forward on P-BCH for MTC enhanced coverage", Vodafone, 3GPP TSG RAN WG1 #75 R1-135943, Nov. 11-15, 2013.
"Considerations on RACH/PRACH transmission for MTC UE", LG Electronics, 3GPP TSG RAN WG1 Meeting #80bis R1-151494, Apr. 20-24, 2015.
"Email discussion report on [91bis#17][LTE/MTC] Timers", Ericson [rapporteur], 3GPP TSG-RAN WG2 #92 R2-156778, Nov. 16-20, 2015.
Extended European Search Report dated Apr. 16, 2019 issued by the European Patent Office in counterpart application No. 16861756.1.
"Way Forward on PRACH for MTC enhanced coverage", Vodafone, 3GPP TSG RAN WG1 #75 R1-135944, Nov. 11-15, 2013.
International Search Report for PCT/JP2016/004157 dated Nov. 15, 2016.
Communication dated Mar. 2, 2020 from the China National Intellectual Property Administration in Application No. 201680057281. 1.
"Way forward on PDCCH, PDSCH, PUCCH and PUSCH for MTC enhanced coverage", Vodafone Group, 3GPP TGS RAN WG1 #75 R1-136001, Nov. 11-15, 2013.
"RA Preamble Transmission", Samsung, 3GPP TSG RAN WG1 #82bis R1-155438, Oct. 5-9, 2015.
Communication dated Aug. 21, 2020, issued by the Intellectual Property Office of India in application in No. 201918001048.
Japanese Office Communication for JP Application No. 2020-172467 dated Jan. 4, 2022 with English Translation.
LG Electronics Inc., Consideration on coverage enhancement level, 3GPP TSG-RAN WG2 #91 bis, R2-154448, Sep. 25, 2015.

* cited by examiner

|  | CE LEVEL 1 | CE LEVEL 2 | CE LEVEL 3 |
|---|---|---|---|
| MAXIMUM NUMBER OF PRACH ATTEMPTS (maxNumPreambleAttemptCE) | 20 | 60 | 120 |
| NUMBER OF REPETITIONS OF PRACH PER ATTEMPT (numRepetitionPerPreambleAttempt) | 4 | 10 | 20 |

Fig. 4

BASE STATION, RADIO TERMINAL, AND METHODS THEREIN

CROSS REFERENCE TO RELATED APPLICATIONS

This is a Continuation application of application Ser. No. 15/757,432, filed on Mar. 5, 2018, which is a National Stage of International Application No. PCT/JP2016/004157 filed Sep. 13, 2016, claiming priority based on Japanese Patent Application No. 2015-217963 filed Nov. 5, 2015. The entire disclosures of all the prior applications are considered part of the disclosure of this application and are hereby incorporated by reference in their entirety.

TECHNICAL FIELD

The present disclosure relates to a radio communication system configured to perform communication control for coverage enhancement.

BACKGROUND ART

In the 3rd Generation Partnership Project (3GPP), standardization of techniques for improving deterioration of communication quality due to recent sharp increase in mobile traffic and for achieving faster communication has been performed. Further, standardization of techniques for avoiding an increase in a control signaling load due to connections of an enormous number of Machine to Machine (M2M) terminals to a Long Term Evolution (LTE) or LTE-Advanced network has been performed. The M2M terminals are, for example, terminals that perform communication without human intervention. The M2M terminals are placed in various types of equipment including machines (e.g., vending machines, gas meters, electric meters, vehicles, railway vehicles, and ships) and sensors (e.g., environmental, agricultural, and traffic sensors). In the LTE and LTE-Advanced, communications performed by the M2M terminals is referred to as Machine Type Communication (MTC) and a terminal performing the MTC is referred to as an MTC terminal (i.e., MTC User Equipment (MTC UE)).

While M2M service providers need to distribute an enormous number of M2M terminals, there is a limit to the cost allowable for each M2M terminal. Therefore, it is required that M2M terminals be implemented at a low cost, and M2M terminals be able to perform communication with low power consumption, for example. Further, in one use case, MTC UEs perform communication while they are fixedly or statically installed in buildings. In this case, the radio quality of the MTC UEs may be always low and accordingly coverage enhancement technique is especially needed for the MTC UEs compared to normal UEs having mobility (e.g., mobile telephones, smartphones, tablet computers, and notebook personal computers (notebook PCs)). Further, functional restrictions contributing to reduction of the cost include, for example, a low maximum transmission power, a small number of reception antennas (e.g., only one reception antenna), no support of high-order modulation schemes (e.g., 64 quadrature amplitude modulation (64QAM)), and a narrow operating bandwidth (e.g., 1.4 MHz), which lower the maximum transmission rate of the MTC UEs.

Therefore, in the 3GPP, standardization of techniques for improving or enhancing communication characteristics of MTC UEs (i.e., coverage), which are expected to be lower than those of normal UEs, has been performed (Non-Patent Literature 1). The following description provides some examples of the techniques for enhancing coverage of MTC UEs discussed in the 3GPP. It can be said that the coverage enhancement techniques (or coverage enhancement processing) for MTC UEs described below are processing for improving or enhancing communication characteristics or communication quality of MTC UEs. The state of a UE to which these special coverage enhancement techniques have been applied is referred to as a Coverage Enhancement (CE) Mode, a Coverage Extension (CE) Mode, an Enhanced Coverage Mode (ECM), or an Extended Coverage Mode (ECM).

The coverage enhancement techniques can improve, for example, a reception characteristic of a Physical Broadcast Channel (PBCH), a transmission characteristic of a Physical Random Access Channel (PRACH) preamble (i.e., detection characteristic in a radio base station (an evolved NodeB (eNB))), a reception characteristic of a Physical Downlink Control Channel (PDCCH), a reception characteristic of a Physical Downlink Shared Channel (PDSCH), a transmission characteristic of a Physical Uplink Control Channel (PUCCH), and a transmission characteristic of a Physical Uplink Shared Channel (PUSCH). The PBCH is a downlink broadcast channel used by an eNB to transmit common broadcast information in a cell. The PRACH is an uplink physical channel used by a UE for an initial access (i.e., a random access) to an eNB. The PDCCH is a downlink physical channel used for, for example, scheduling information of downlink data (DL assignment) and transmission of radio resource allocation information of uplink data (UL grant) by an eNB. The PDSCH is a downlink physical channel used for reception of system information and data by a UE. The PUSCH is an uplink physical channel used for data transmission by a UE.

One processing that is being discussed to improve the reception characteristic of the PBCH is to repeatedly transmit broadcast information about the PBCH a number of extra times as compared to the normal operation by a certain number of times (see Non-Patent Literature 2). One processing that is being discussed to improve the transmission characteristic of the PRACH is to repeatedly transmit the PRACH (i.e., preamble) a certain number of times (see Non-Patent Literature 3). Further, one processing that is being discussed to improve the reception characteristic of the PDSCH and the transmission characteristic of the PUCCH and the PUSCH is to repeatedly transmit the PDSCH, the PUCCH, and the PUSCH over multiple subframes (see Non-Patent Literature 4). Further, one processing that is being discussed to improve the reception characteristic of an M-PDCCH, which is a PDCCH to transmit L1/L2 control information for MTC UEs, is to repeatedly transmit the M-PDCCH over multiple subframes. According to the above processing, communication characteristics of MTC UEs that are expected to be lower than those of normal UEs will be improved. When downlink data is scheduled by repetitive transmission of the M-PDCCH, it has been discussed to transmit this data at a subframe after the subframe at which the last repetitive transmission of the M-PDCCH is performed. It has further been discussed to include the number of repetitions of the M-PDCCH (the number of repetitions to be actually performed) in downlink (DL) control information contained in this M-PDCCH.

The number of repetitions of transmission and the number of repetitions of reception that are required for improvement of the communication characteristics depend on the place where am MTC UE is installed and the pathloss between the MTC UE and the eNB. Therefore, the coverage enhancement technique provides a plurality of coverage enhancement levels (CE levels). The coverage enhancement levels (CE levels) may also be referred to as enhanced coverage levels, coverage extension levels, extended coverage levels, or repetition levels (e.g., PRACH repetition levels). Further, a one-to-one relation or a certain relative relation may be configured in advance between the CE level and the Repetition level.

For example, the coverage enhancement technique provides three CE levels in addition to normal coverage (zero coverage extension). The CE levels are associated respectively with different numbers of repetitions of transmission and with different numbers of repetitions of reception. The number of repetitions of transmission and the number of repetitions of reception used in a high CE level are larger than those used in a low CE level. Each MTC UE is allocated to a higher CE level, as the pathloss between the MTC UE and the eNB increases. In some implementations, an MTC UE measures a Reference Signal Received Power (RSRP) from the eNB or measures an estimated pathloss between the MTC UE and the eNB, determines (or estimates) a required CE level based on the measured RSRP or pathloss, and then transmits a random access preamble (RACH preamble) in accordance with the maximum number of repetitions of transmission associated with the determined CE level (see Patent Literature 1).

CITATION LIST

Patent Literature

[Patent Literature 1] International Patent Publication No. WO 2015/021315

Non-Patent Literature

[Non-Patent Literature 1] 3GPP TR 36.888 V12.0.0 (2013-06), "3rd Generation Partnership Project; Technical Specification Group Radio Access Network; Study on provision of low-cost Machine-Type Communications (MTC) User Equipments (UEs) based on LTE (Release 12)", June 2013
[Non-Patent Literature 2] 3GPP R1-135943, Vodafone, "Way Forward on P-BCH for MTC enhanced coverage", 3GPP TSG RAN WG1#75, San Francisco, USA, 11-15 Nov. 2013
[Non-Patent Literature 3] 3GPP R1-135944, Vodafone, "Way Forward on PRACH for MTC enhanced coverage", 3GPP TSG RAN WG1#75, San Francisco, USA, 11-15 Nov. 2013
[Non-Patent Literature 4] 3GPP R1-136001, Vodafone et al. "Way forward on PDCCH, PDSCH, PUCCH and PUSCH for MTC enhanced coverage", 3GPP TSG RAN WG1#75, San Francisco, USA, 11-15 Nov. 2013

SUMMARY OF INVENTION

Technical Problem

An eNB needs to provide an MTC UE that supports the coverage enhancement technique with a plurality of radio resource configurations for a plurality of CE levels. For example, the eNB uses system information for MTC UEs (i.e., System Information Block x-bis (SIB x-bis)), such as SIB1-bis or SIB2-bis, to transmit in a cell a radio resource configuration for an initial access (i.e., random access) performed by an MTC UE in an idle state. If the system information needs to explicitly include a plurality of radio resource configurations for a plurality of CE levels, the data size of the system information increases.

One of the objects to be attained by embodiments disclosed herein is to provide an apparatus, a method, and a program that contribute to reduction of data size (i.e., signaling overhead) necessary for a base station to notify a radio terminal of a plurality of radio resource configurations for a plurality of coverage enhancement levels. It should be noted that this object is merely one of the objects to be attained by the embodiments disclosed herein. Other objects or problems and novel features will be made apparent from the descriptions in the specification and the accompanying drawings.

Solution to Problem

In a first aspect, a base station includes a memory and at least one processor coupled to the memory. The at least one processor is configured to transmit to a radio terminal a first value of a first radio resource configuration information element and information about a conversion factor. The first value is associated with normal coverage or with a first coverage enhancement level. The value of the conversion factor obtained from the information about the conversion factor is used by the radio terminal to derive a second value of the first radio resource configuration information element. The second value is associated with a second coverage enhancement level.

In a second aspect, a method in a base station includes transmitting to a radio terminal a first value of a first radio resource configuration information element and information about a conversion factor. The first value is associated with normal coverage or with a first coverage enhancement level. The value of the conversion factor obtained from the information about the conversion factor is used by the radio terminal to derive a second value of the first radio resource configuration information element. The second value is associated with a second coverage enhancement level.

In a third aspect, a radio terminal includes a memory and at least one processor coupled to the memory. The at least one processor is configured to execute at least one module. The at least one module includes a reception module and a calculation module. The reception module is configured to receive from a base station a first value of a first radio resource configuration information element. The first value is associated with normal coverage or with a first coverage enhancement level. The calculation module is configured to derive a second value of the first radio resource configuration information element by converting the first value using a value of a conversion factor. The second value is associated with a second coverage enhancement level.

In a fourth aspect, a method in a radio terminal includes: (a) receiving from a base station a first value of a first radio resource configuration information element, the first value being associated with normal coverage or with a first coverage enhancement level; and (b) deriving a second value of the first radio resource configuration information element by converting the first value using a value of a conversion factor, the second value being associated with a second coverage enhancement level.

In a fifth aspect, a program includes instructions (software codes) that, when loaded into a computer, cause the computer to perform the method according to the above-described second or fourth aspect.

Advantageous Effects of Invention

According to the above-described aspects, it is possible to provide an apparatus, a method, and a program that contribute to reduction of data size (i.e., signalling overhead) necessary for a base station to notify a radio terminal of a plurality of radio resource configurations for a plurality of coverage enhancement levels.

BRIEF DESCRIPTION OF DRAWINGS

FIG. 4 is a diagram showing an example of values of a radio resource configuration information element for a plurality of CE levels;

DESCRIPTION OF EMBODIMENTS

Specific embodiments are described hereinafter in detail with reference to the drawings. The same or corresponding elements are denoted by the same reference signs throughout the drawings, and repetitive descriptions will be omitted as necessary for clarity of explanation.

The embodiments described below may be implemented independently or in combination with any another. These embodiments include novel characteristics different from one another. Accordingly, these embodiments contribute to attaining objects or solving problems different from one another and also contribute to obtaining advantages different from one another.

The following descriptions on the embodiments mainly focus on an Evolved Packet System (EPS) that contains LTE and System Architecture Evolution (SAE). However, these embodiments are not limited to being applied to the EPS and may be applied to other mobile communication networks or systems such as 3GPP UMTS, 3GPP2 CDMA2000 systems (1×RTT, High Rate Packet Data (HRPD)), global system for mobile communications (GSM (trademark))/General packet radio service (GPRS) systems, and WiMAX systems.

First Embodiment

Figure 1:
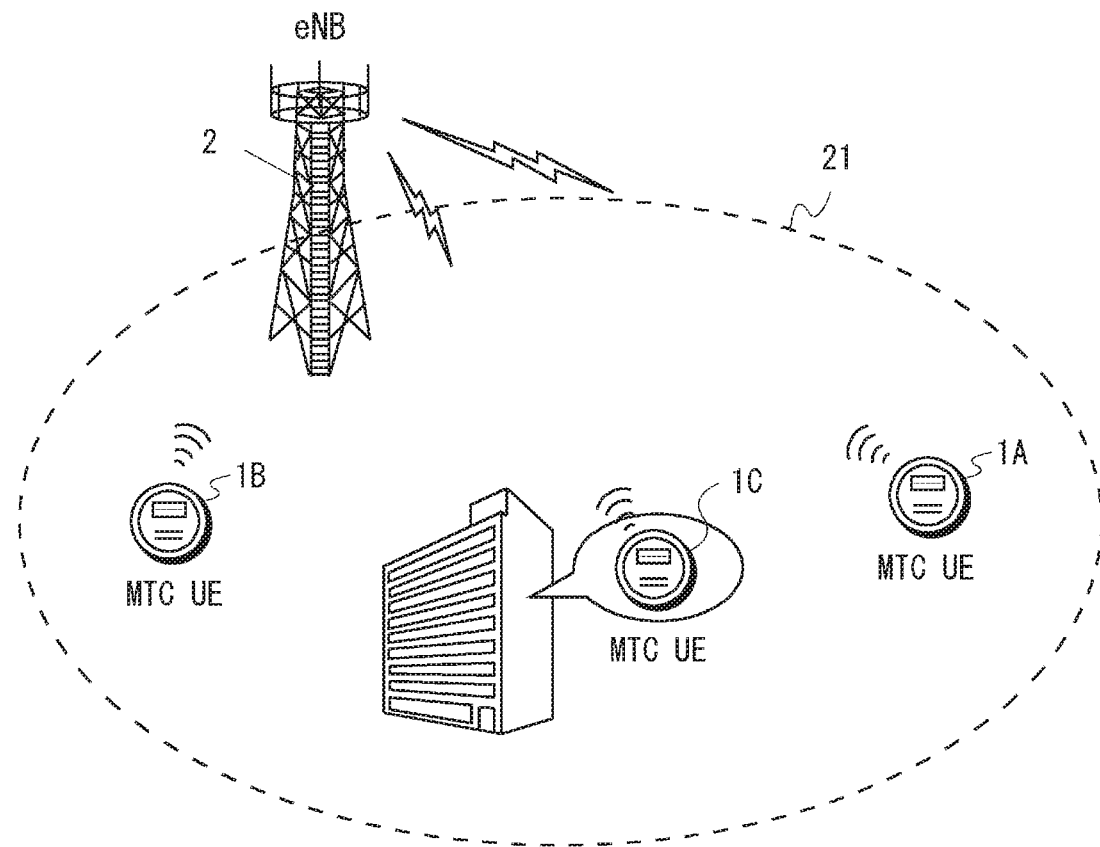
FIG. 1 is a diagram showing a configuration example of a radio communication network according to several embodiments.

FIG. 1 shows a configuration example of a radio communication network according to several embodiments including this embodiment. In the example shown in FIG. 1, the radio communication network includes one or more radio terminals (i.e., MTC UEs) 1 and a base station (eNB) 2. Each MTC UE 1 is equipped with at least one wireless transceiver and is configured to perform cellular communication with the eNB 2. The eNB 2 is configured to manage a cell 21 and perform cellular communication with the MTC UEs 1 using a cellular communication technology (e.g., Evolved Universal Terrestrial Radio Access (E-UTRA) technology).

The eNB 2 shown in FIG. 1 may be a Baseband Unit (BBU) used in the Centralized Radio Access Network (C-RAN) architecture. In other words, the eNB 2 shown in FIG. 1 may be a RAN node to be connected to one or more Remote Radio Heads (RRHs). In some implementations, the eNB 2 serving as a BBU takes charge of control-plane processing and digital baseband signal processing for the user-plane. On the other hand, each RRH takes charge of analog Radio Frequency (RF) signal processing (e.g., frequency conversion and signal amplification). The C-RAN is also referred to as a Cloud RAN. The BBU is also referred to as a Radio Equipment Controller (REC) or a Data Unit (DU). The RRH is also referred to as a Radio Equipment (RE), a Radio Unit (RU), or a Remote Radio Unit (RRU).

In the example shown in FIG. 1, the distance between the eNB 2 and the MTC UE 1A is larger than the distance between the eNB 2 and the MTC UE 1B. Accordingly, it is assumed that the MTC UE 1A has a larger pathloss and its radio quality is degraded. Further, the MTC UE 1C is installed inside a structure (e.g., a building) and it is thus assumed that its radio quality becomes lower than that in a case in which the MTC UE 1C is installed outdoors. Furthermore, if the capabilities or functions of the MTC UEs 1 are limited compared to those of other UEs (e.g., smartphones and tablet computers) that perform human type communication, such as voice communication and web browsing, it is expected that degradation in the radio quality of the MTC UEs 1 will become more serious. Accordingly, the MTC UEs 1 according to this embodiment support the aforementioned coverage enhancement technique.

As already described above, repetition of DL transmission, e.g., repetitive transmission of system information, M-PDCCH, and PDSCH may be used to improve the downlink (DL) cell coverage. To improve the uplink (UL) cell coverage, repetition of UL transmission, e.g., repetitive transmission of RACH preamble, PUCCH, and PUSCH may be used.

The MTC UE 1 may support a plurality of CE modes (or ECMs). In some implementations, the MTC UE 1 may support CE modes (or ECMs) for the RRC_IDLE state and other CE modes (or ECMs) for the RRC_CONNECTED state. Additionally or alternatively, the MTC UE 1 may support either CE modes (or ECMs) for the RRC_IDLE state or CE modes (or ECMs) for the RRC_CONNECTED state. In some implementations, plural coverage enhancement levels are defined per CE mode (or per ECM). Additionally or alternatively, in some implementations, plural CE modes provide plural coverage enhancement levels that differ from one another.

Figure 2:
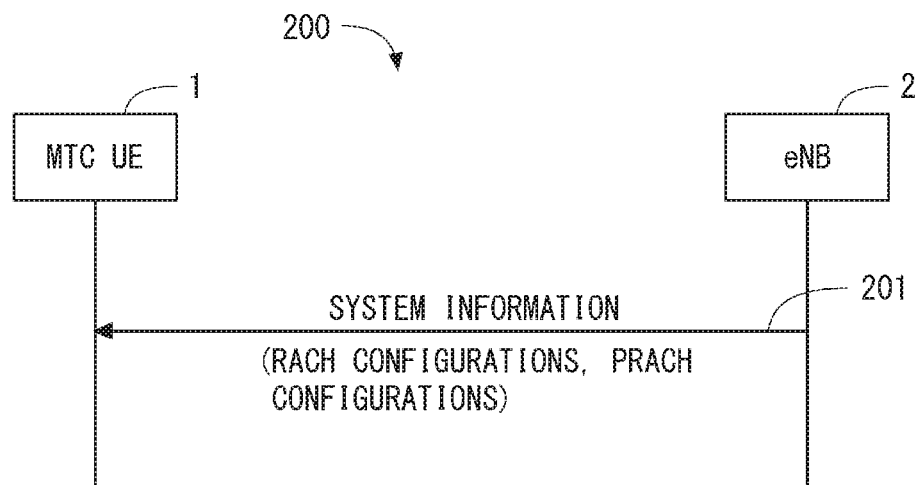
FIG. 2 is a sequence diagram showing an example of an operation of transmitting system information according to a first embodiment.

FIG. 2 shows an example (Process 200) of an operation of transmitting system information according to this embodiment. In Step 201, the eNB 2 transmits system information (e.g., SIB1-bis, SIB2-bis) in the cell 21. The eNB 2 may repetitively transmit the system information (SIB1bis, SIB2-bis) in accordance with a coverage enhancement configuration for the DL of the cell 21.

The system information transmitted in Step 201 contains information explicitly or implicitly indicating that the coverage enhancement technique (Coverage enhancement solution) is supported in the cell and control information used for the coverage enhancement technique (e.g., coverage enhancement configuration). In particular, the system information contains a value (hereinafter referred to as a "base value") of a first radio resource configuration information element (IE). This value is associated with normal coverage (zero coverage extension) or with a first coverage enhancement (CE) level (e.g., a CE level 1). The first radio resource configuration IE needs to be set to different values for different CE levels. For example, the first radio resource configuration IE may pertain to at least one of an UL message, an UL physical channel, a DL message, and a DL physical channel, each of which is repetitively transmitted in a random access procedure.

In some implementations, the first radio resource configuration IE may include at least one of the following IEs regarding a RACH configuration:
   numberOfRA-Preambles;
   maxNumPreambleAttemptCE;
   numRepetitionPerPreambleAttempt;
   ra-ResponseWindowSize;
   mac-ContentionResolutionTimer;
   maxHARQ-Msg3Tx; and
   numRepetitionPerRA-Response.

The "numberOfRA-Preambles" IE indicates the total number of random access preambles (i.e., RACH preambles) available for contention-based random access. The "maxNumPreambleAttemptCE" IE indicates the maximum number of PRACH attempts (per CE level). The "numRepetitionPerPreambleAttempt" IE indicates the number of repetitions of preamble transmission per PRACH attempt (per CE level). The "ra-ResponseWindowSize" IE indicates the duration of a random access (RA) response window. The "mac-ContentionResolutionTimer" IE indicates a timer value of a MAC contention resolution timer to wait for reception of a Medium Access Control (MAC) Contention Resolution message for RA Contention Resolution from the eNB 2 after a third message (Msg3) (i.e., RRC Connection Request message) in the random access procedure is transmitted to the eNB 2. The "maxHARQ-Msg3Tx" IE indicates the maximum number of Hybrid Automatic Repeat Request (HARQ) retransmissions of a third message (Msg3) (i.e., RRC Connection Request message) in the random access procedure. The "numRepetitionPerRA-Response" IE indicates the number of repetitions (per CE level) of M-PDCCH transmission used for transmission of a second message (Msg2) (i.e., random access response (RAR) message) in the random access procedure, or indicates the number of repetitions of RAR message transmission in the random access procedure. The names of these IEs are merely examples and other names may be used for these IEs.

Figure 3:
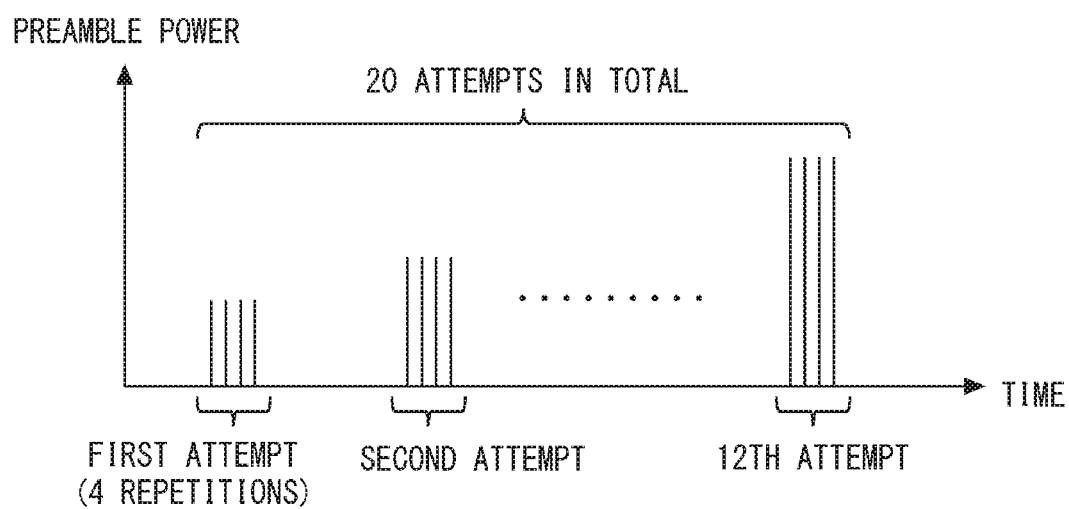
FIG. 3 is a diagram showing an example of repetitive transmission of a RACH preamble.

FIG. 3 shows an example of the repetitive RACH-preamble transmission performed by the MTC UE 1 supporting the coverage enhancement technique. In the example shown in FIG. 3, the MTC UE 1 repeats four preamble transmissions for one PRACH attempt, and performs 20 PRACH attempts at maximum. If one attempt is failed, the MTC UE 1 increases the transmission power of an RACH preamble in accordance with the power ramping scheme and starts the next attempt.

FIG. 4 shows an example of values of radio resource configuration information elements for plural CE levels. In the example shown in FIG. 4, the value of the "maxNumPreambleAttemptCE" IE associated with the minimum CE level (i.e., CE level 1) is 20, and the value of the "numRepetitionPerPreambleAttempt" IE associated with the minimum CE level (i.e., CE level 1) is 4. This corresponds to the example shown in FIG. 3. On the other hand, in higher CE levels, the maximum number of PRACH attempts and the number of repetitions of preamble transmission per PRACH attempt both increase. Specifically, with regard to CE level 2, the value of the "maxNumPreambleAttemptCE" IE is 60 and the value of the "numRepetitionPerPreambleAttempt" IE is 10. Further, with regard to CE level 3, the value of the "maxNumPreambleAttemptCE" IE is 120 and the value of the "numRepetitionPerPreambleAttempt" IE is 20.

In some implementations, the first radio resource configuration IE may include at least one of the following IEs regarding a PRACH configuration:
   prach-ConfigIndex; and
   prach-FreqOffset.

The "prach-ConfigIndex" IE indicates a value (i.e., R_Slot) to define when the MTC UE 1 should transmit a random access preamble in frequency/time grids. The "prach-FreqOffset" IE indicates a frequency offset value to specify a Physical Resource Block (PRB) available for RACH access.

The 3GPP specification specifies a set of a predetermined number of (e.g., eight) values or a one-dimensional array that can be set in a radio resource configuration IE. These values are arranged in their ascending order or descending order, for example, and each of these values is associated with an index value indicating a rank in the ascending order or the descending order. Accordingly, each radio resource configuration IE indicates an index value representing any one of the values included in the set or the one-dimensional array. For example, in the 3GPP Release 12, the RA response window size is in unit of subframes and can have eight different values, i.e., 2, 3, 4, 5, 6, 7, 8, or 10 subframes. Accordingly, the "ra-ResponseWindowSize" IE has a 3-bit length and indicates one of these eight different values by the 3-bit index value.

The MTC UE 1 receives from the eNB 2 the base value of the first radio resource configuration IE associated with the normal coverage (zero coverage extension, CE level 0) or the first CE level (e.g., CE level 1), and then derives from the received base value a value (i.e., the second value) of the first radio resource configuration IE associated with another CE level (i.e., the second CE level (e.g., CE level 2)). Accordingly, the MTC UE 1 does not need to receive from the eNB 2 an additional IE that explicitly indicates the second value of the first radio resource configuration IE associated with the second CE level.

To be more specific, the MTC UE 1 uses a value of a conversion factor to derive the second value associated with the second CE level (e.g., CE level 2) from the base value received from the eNB 2. The conversion factor may be simply referred to as a factor. To support the derivation of the second value in the MTC UE 1, in some implementations, the eNB 2 may further incorporate the value of the conversion factor into the system information transmitted in Step 201 of FIG. 2. Alternatively, in some implementations, the eNB 2 may further incorporate information that indirectly indicates the value of the conversion factor, or information to derive the value of the conversion factor, into the system information transmitted in Step 201 of FIG. 2. For example, the information that indirectly indicates the value of the conversion factor may be an index that specifies one value from among a set of predetermined candidate values. For example, the information to derive the value of the conversion factor may include one or more parameters to be substituted into a predetermined formula for calculating the conversion factor. That is, the eNB 2 may transmit, to the MTC UE 1, information about the conversion factor (e.g., the value of the conversion factor itself, information indirectly indicating the value of the conversion factor, or information to derive the value of the conversion factor). The information about the conversion factor is used by the MTC UE 1 to obtain the value of the conversion factor. In this case, the conversion factor and the procedure for deriving (or calculating) the second value using the conversion factor are defined in such a way that the data size of the information about the conversion factor is smaller than the data size that is necessary to explicitly transmit to the MTC UE 1, from the eNB 2, values of one or more radio resource configuration IEs associated with the second CE level.

Prior to Step 201, the eNB 2 may calculate the value of the conversion factor to be transmitted to the MTC UE 1. Specifically, the eNB 2 may determine a value(s) of the first radio resource configuration IE for one or more second CE levels (e.g., CE levels 1-3), and then calculate one or more values of the conversion factor for the one or more second CE levels using the determined IE value(s) and the base value of the first radio resource configuration IE (e.g., the IE value for CE level 0).

In another implementation, the MTC UE 1 may store a default value of the conversion factor in its memory in advance, and use the default value to derive the second value from the base value of the first radio resource configuration IE when the conversion factor is not explicitly transmitted from the eNB 2.

Figure 5:
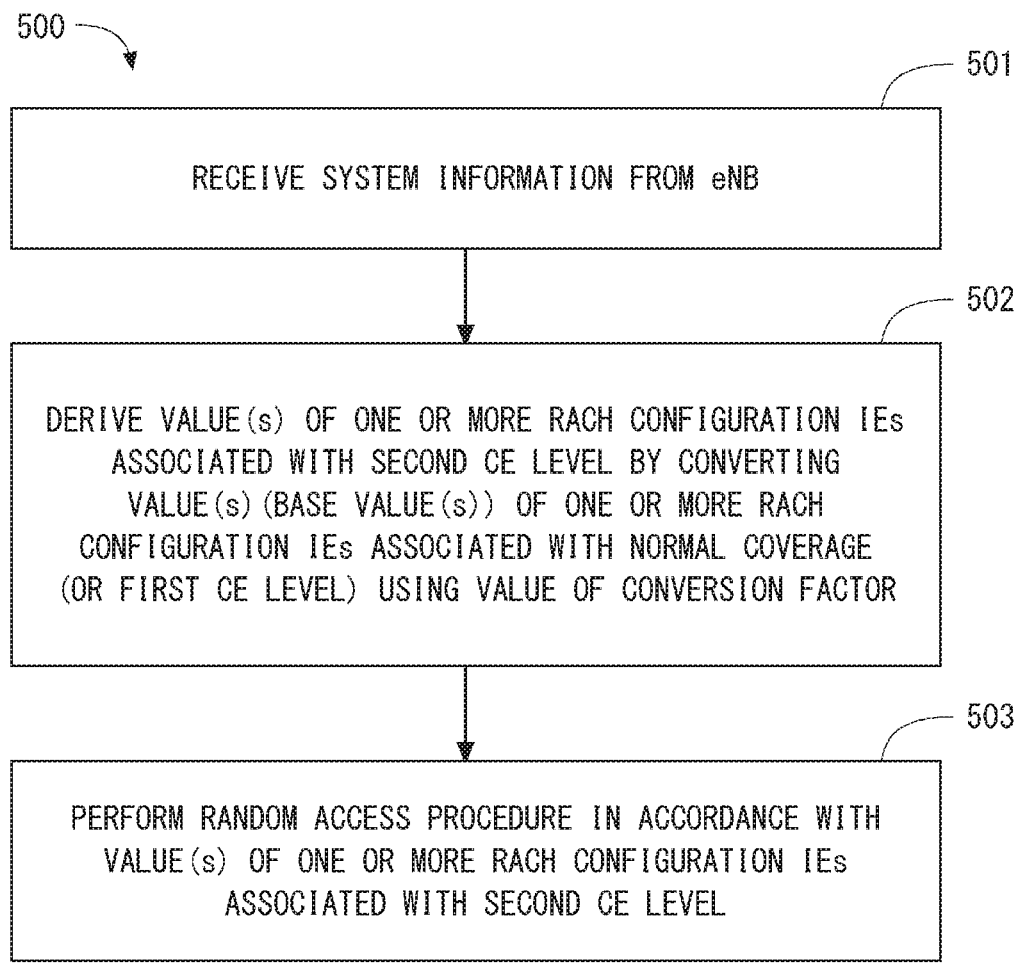
FIG. 5 is a flowchart showing an example of operations of a radio terminal according to the first embodiment.

FIG. 5 is a flowchart showing an example (Process 500) of the operations of the MTC UE 1. In Step 501, the MTC UE 1 receives, from the eNB 2, system information containing the base value of the first radio resource configuration IE. As already described above, the base value of the first radio resource configuration IE is the value of the first radio resource configuration IE associated with the normal coverage (i.e., zero coverage extension) or the first CE level (e.g., CE level 1). This system information may further contain the conversion factor used to derive from the base value the second value of the first radio resource configuration IE associated with the second CE level.

In Step 502, the MTC UE 1 derives the value of the first radio resource configuration IE associated with the second CE level by converting the base value of the first radio resource configuration IE associated with the normal coverage (or the first CE level) using the value of the conversion factor. The first radio resource configuration IE includes, for example, one or more RACH configuration IEs (e.g., ra-ResponseWindowSize and mac-ContentionResolution-Timer). In this case, the MTC UE 1 uses the value of the conversion factor to derive the second value(s) associated with the first CE level (or the second CE level) from the base value(s) of the one or more RACH configuration IEs associated with the normal coverage (or the first CE level).

The MTC UE 1 may calculate the reference signal received power (RSRP) from the eNB 2 or an estimated pathloss between the MTC UE 1 and the eNB 2 and determine, based on the calculated RSRP or pathloss, the CE level that is required. In Step 503, if the MTC UE 1 requires the second CE level, the MTC UE 1 performs the random access procedure in accordance with the second value(s) of the first radio resource configuration IE(s) derived in Step 502 (e.g., ra-ResponseWindowSize and mac-ContentionResolutionTimer).

The following provides some examples of the conversion factor and some examples of the procedure for deriving (or calculating) the second value of the radio resource configuration IE from its base value using the conversion factor. In the first example shown in FIG. 6, the conversion factor indicates a multiplier factor. Further, in the first example, a common value of the conversion factor (i.e., multiplier factor) is used to derive two or more values, associated with the second CE level, of two or more radio resource configuration IEs (e.g., ra-ResponseWindowSize and mac-ContentionResolutionTimer). Accordingly, in the first example, the eNB 2 needs only to transmit a common value of the conversion factor instead of transmitting two or more values of the two or more radio resource configuration IEs associated with the second CE level. Accordingly, in the first example, it is possible to reduce data size necessary for a base station to notify a radio terminal of a plurality of radio resource configurations for a plurality of CE levels. The conversion factor in the first example may also be called a scaling factor, a coefficient, or a scaling coefficient.

Figure 6:
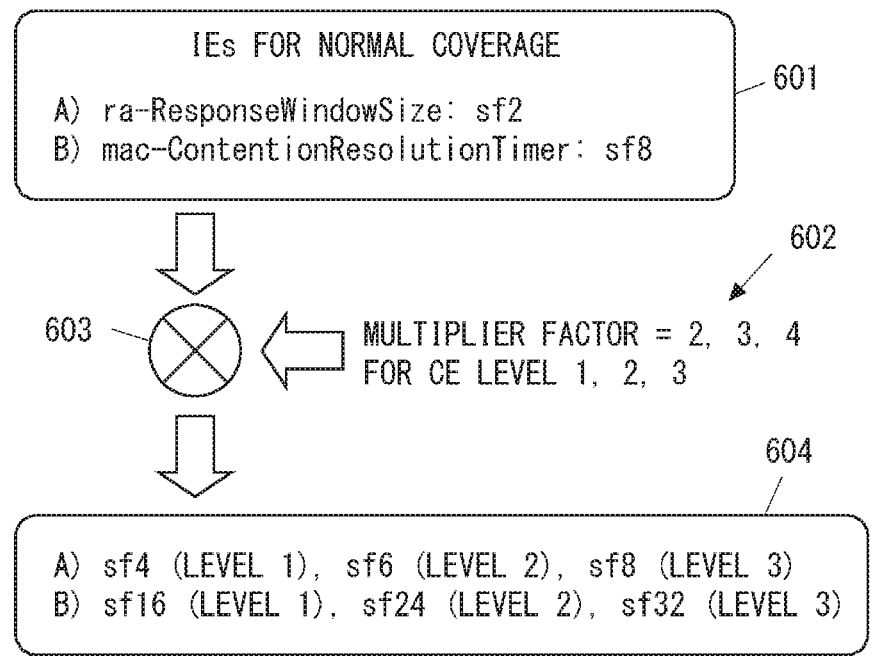
FIG. 6 is a diagram showing a first example of calculations for deriving a radio resource configuration information element by the radio terminal according to the first embodiment.

To be more specific, in the example shown in FIG. 6, the MTC UE 1 receives values of the "ra-ResponseWindowSize" and "mac-ContentionResolutionTimer" IEs for the normal coverage (i.e., zero coverage extension or CE level 0) from the eNB 2 in the SIB (601). In FIG. 6, the RA response window size (i.e., ra-ResponseWindowSize) for the normal coverage is 2 subframes (i.e., sf2) and the length of the contention resolution timer (i.e., mac-ContentionResolutionTimer) for the normal coverage is 8 subframes (i.e., sf8).

The MTC UE 1 further receives three values of the conversion factor (i.e., multiplier factor) each associated with a respective one of three CE levels (i.e., CE levels 1, 2, and 3) from the eNB 2 (602). In FIG. 6, the values of the conversion factor (i.e., multiplier factor) for CE levels 1, 2, and 3 are 2, 3, and 4, respectively. Alternatively, the MTC UE 1 may receive from the eNB 2 only one value of the conversion factor corresponding to one CE level that is necessary among the three CE levels.

The MTC UE 1 multiplies each of the two or more IE values for the normal coverage (601) by each of the values of the conversion factor (multiplier factor) (603). Accordingly, the MTC UE 1 is able to derive two or more values of the two or more IEs for each of CE level 1, 2, and 3 (604). The MTC UE 1 may calculate only the values associated with one CE level that is necessary among the three CE levels.

Figure 7:
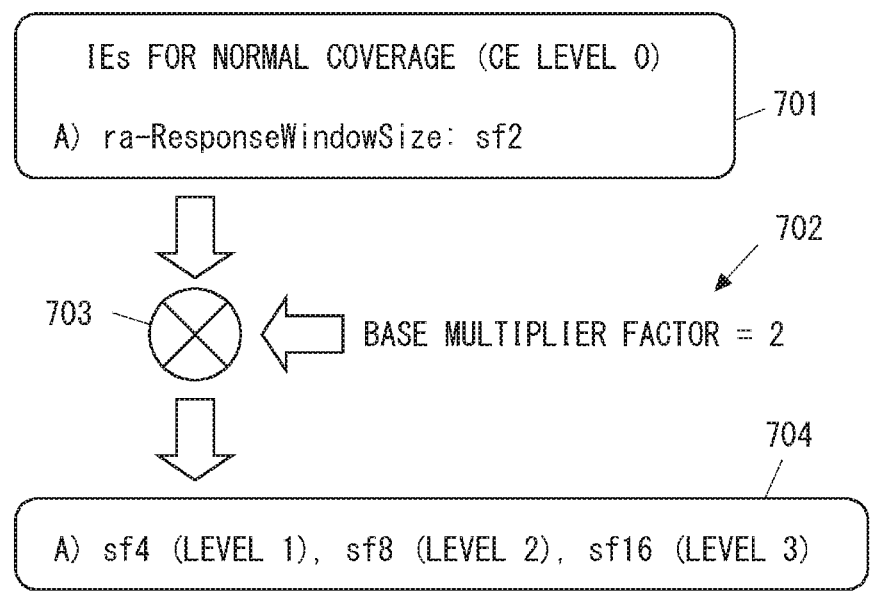
FIG. 7 is a diagram showing a second example of the calculations for deriving a radio resource configuration information element by the radio terminal according to the first embodiment.

In the second example shown in FIG. 7, two or more IE values for two or more CE levels are calculated using a common value of the conversion factor. Specifically, the MTC UE 1 calculates the third value of the radio resource configuration IE associated with the third CE level, as well as the second value associated with the second CE level, using the base value of the radio resource configuration IE and the value of the conversion factor. Accordingly, in the second example, the eNB 2 needs only to transmit a common value of the conversion factor instead of transmitting two or more values, associated with the second and third CE levels, of the first radio resource configuration IE. Accordingly, in the second example, it is possible to reduce data size necessary for a base station to notify a radio terminal of a plurality of radio resource configurations for a plurality of CE levels.

To be more specific, in the example shown in FIG. 7, the MTC UE 1 receives a value of the "ra-ResponseWindowSize" IE for the normal coverage (i.e., zero coverage extension or CE level 0) from the eNB 2 in the SIB (701). In FIG. 7, the RA response window size (i.e., ra-ResponseWindowSize) for the normal coverage is 2 subframes (i.e., sf2).

The MTC UE 1 further receives, from the eNB 2, a common value of the conversion factor (i.e., base multiplier factor) used to obtain three IE values for three CE levels (i.e., CE levels 1, 2, and 3) (702). In FIG. 7, the value of the conversion factor (i.e., base multiplier factor) is 2.

The MTC UE 1 multiplies the value of the radio resource configuration IE (701) for the normal coverage by the value of the conversion factor (i.e., base multiplier factor) (703). Accordingly, the MTC UE 1 is able to derive the IE value for CE level 1 (704). Further, to obtain the IE value for CE level 2, the MTC UE 1 multiplies the IE value for CE level 1 by the value of the conversion factor (i.e., base multiplier factor). That is, in the example shown in FIG. 7, the value of the conversion factor (i.e., base multiplier factor) directly or indirectly specifies scaling factors of the IE value for the normal coverage to the respective IE values for the two or more CE levels. The MTC UE 1 is thus able to calculate two or more IE values respectively for two or more CE levels based on the common value of the conversion factor (i.e., base multiplier factor).

Figure 8:
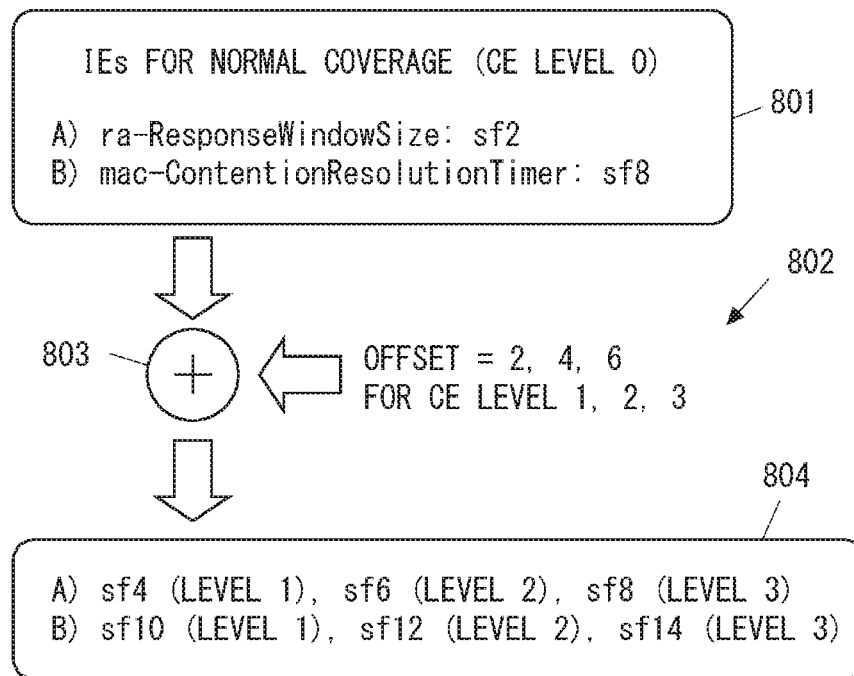
FIG. 8 is a diagram showing a third example of the calculations for deriving a radio resource configuration information element by the radio terminal according to the first embodiment.

In the third example shown in FIG. 8, the conversion factor represents an offset. In the third example, similar to the above-described first example, one value of the conversion factor (i.e., offset) is used to derive two or more values, associated with the second CE level, of respective two or more radio resource configuration IEs (e.g., ra-ResponseWindowSize and mac-ContentionResolutionTimer). Accordingly, in the third example, similar to the first example, it is possible to reduce data size necessary for a base station to notify a radio terminal of a plurality of radio resource configurations for a plurality of CE levels.

To be more specific, in the example shown in FIG. 8, the MTC UE 1 receives values of the "ra-ResponseWindowSize" and "mac-ContentionResolutionTimer" IEs for the normal coverage (i.e., zero coverage extension or CE level 0) from the eNB 2 in the SIB (801). In FIG. 8, the RA response window size (i.e., ra-ResponseWindowSize) for the normal coverage is 2 subframes (i.e., sf2) and the length of the contention resolution timer for the normal coverage (i.e., mac-ContentionResolutionTimer) is 8 subframes (i.e., sf8).

The MTC UE 1 further receives three values of the conversion factor (i.e., offset) each associated with a respective one of three CE levels (i.e., CE levels 1, 2, and 3) from the eNB 2 (802). In FIG. 8, the values of the conversion factor (i.e., offset) for CE levels 1, 2, and 3 are 2, 4, and 6, respectively. Alternatively, the MTC UE 1 may receive from the eNB 2 only one value of the conversion factor corresponding to one CE level that is necessary among the three CE levels.

The MTC UE 1 adds the value of the conversion factor (offset) to each of the two or more IE values (801) for the normal coverage (803). The MTC UE 1 is thus able to derive two or more values of the two or more IEs for each of CE level 1, 2, and 3 (804). The MTC UE 1 may calculate only the values associated with one CE level that is necessary among the three CE levels.

Figure 9:
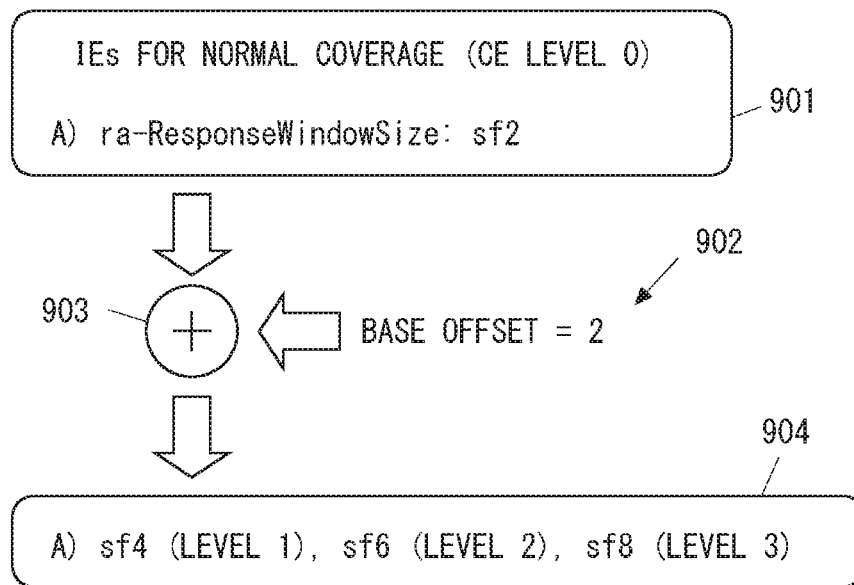
FIG. 9 is a diagram showing a fourth example of the calculations for deriving a radio resource configuration information element by the radio terminal according to the first embodiment.

In the fourth example shown in FIG. 9, similar to the above-described second example, two or more IE values for two or more CE levels are calculated using a common value of a conversion factor. Accordingly, in the fourth example, similar to the second example, it is possible to reduce data size necessary for a base station to notify a radio terminal of a plurality of radio resource configurations for a plurality of CE levels. In the fourth example, a base offset is used as the conversion factor.

To be more specific, in the example shown in FIG. 9, the MTC UE 1 receives a value of the "ra-ResponseWindowSize" IE for the normal coverage (i.e., zero coverage extension or CE level 0) from the eNB 2 in the SIB (e.g., SIB2-bis) (901). In FIG. 9, the RA response window size (i.e., ra-ResponseWindowSize) for the normal coverage is 2 subframes (i.e., sf2).

The MTC UE 1 further receives, from the eNB 2, a common value of the conversion factor (i.e., base offset) used to obtain three IE values for three CE levels (i.e., CE levels 1, 2, and 3) (902). In FIG. 9, the value of the conversion factor (i.e., base offset) is 2.

The MTC UE 1 adds the value of the conversion factor (i.e., base offset) to the value (901) of the radio resource configuration IE for the normal coverage (903). Accordingly, the MTC UE 1 is able to derive the IE value for CE level 1 (904). Further, to obtain the IE value for CE level 2, the MTC UE 1 adds the value of the conversion factor (i.e., base offset) to the IE value for CE level 1. That is, in the example shown in FIG. 9, the value of the conversion factor (i.e., base offset) indirectly specifies scaling factors of the IE value for the normal coverage to the respective IE values for the two or more CE levels. Accordingly, the MTC UE 1 is able to calculate two or more IE values for two or more CE levels based on a common value of the conversion factor (i.e., base offset).

The fifth example is a modified example of the above-described first example. In the fifth example, the conversion factor indicates a divisor factor. In the fifth example, similar to the first example, one value of the conversion factor (i.e., divisor factor) is used to derive two or more values, associated with the second CE level, of respective two or more radio resource configuration IEs. In some implementations, the MTC UE 1 divides the two or more values of the respective two or more IEs for the normal coverage by the value of the conversion factor (i.e., divisor factor) for each CE level. The MTC UE 1 is thus able to derive two or more values of the respective two or more IEs for each CE level. The fifth example may be used to obtain a value of an IE (e.g., maxNumPreambleAttemptCE) that decreases as the CE level becomes higher.

The sixth example is a modified example of the above-described second example. In the sixth example, the conversion factor indicates a base divisor factor. In the sixth example, similar to the second example, two or more IE values for two or more CE levels are calculated using a common value of the conversion factor. In some implementations, the MTC UE 1 divides the IE value for the normal coverage by the value of the conversion factor (i.e., base divisor factor). Accordingly, the MTC UE 1 is able to calculate two or more IE values for two or more CE levels based on a common value of the conversion factor (i.e., base divisor factor). The sixth example may be used to obtain values of an IE (e.g., maxNumPreambleAttemptCE) that decreases as the CE level becomes higher.

The seventh example is a modified example of the above-described first example. In the seventh example, the conversion factor indicates an exponent of the power of an integer m (i.e., power of m). When the conversion factor is a positive integer k, the second value of a radio resource configuration IE is obtained by multiplying the base value of the radio resource configuration IE by the k-th power of m. The value of the base "m" of the exponentiation may be defined by the 3GPP specifications. That is, the value of the base "m" of the exponentiation may be stored in a memory of the MTC UE 1 in advance. For example, when the base "m" is equal to 2 and the value of the conversion factor for CE level 1 is 3, the value of the radio resource configuration IE for CE level 1 is obtained by multiplying the base value of the radio resource configuration IE for the normal coverage (i.e., CE level 0) by $2^3$, i.e., the value for CE level 1 is eight times as large as the base value. In the seventh example, similar to the first example, one value of the conversion factor (i.e., exponent) is used to derive two or more values, associated with the second CE level (e.g., CE level 1), of respective two or more radio resource configuration IEs.

The above-described first to seventh examples may be modified as appropriate. Further, to derive the second value of the radio resource configuration IE from its base value using the conversion factor, a method other than the methods described in the first to sixth examples may be used.

For example, in the first to seventh examples, the value of the conversion factor is a multiplier factor, an offset, a divisor factor, or an exponent of an exponentiation to be used for multiplication, addition, or division of a specific value (e.g., the number of subframes) indicated by the base value (i.e., the index value) of the radio resource configuration IE. Alternatively, the value of the conversion factor may be a multiplier factor, an offset, a divisor factor, or an exponent of an exponentiation to be used for multiplication, addition, or division of the base value itself (i.e., the index value) of the radio resource configuration IE. For example, the base value itself (i.e., the index value) of the radio resource configuration IE may be multiplied by the value of the multiplier factor, which is the conversion factor. In this case, a specific value indicated by the converted index value (e.g., the number of subframes) is used for the corresponding CE level.

The above-described first to seventh examples may be combined as appropriate. For example, when values of respective IEs are calculated using a common conversion factor, the role of the conversion factor (i.e., the calculation method for deriving an IE value) may be different for each IE. For example, the value of the conversion factor may be used as a multiplier factor for multiplication to obtain a value of one IE, and meanwhile the value of the conversion factor may be used as an offset for addition to obtain a value of another IE.

In some implementations, the value of the conversion factor, which is used to obtain a value of the first radio resource configuration IE associated with the second CE level, may also be used as a value, associated with the second coverage enhancement level, of a second radio resource configuration IE different from the first radio resource configuration IE. For example, the MTC UE 1 may use one or both of the value of the "numRepetitionPerPreambleAttempt" IE indicating the number of preamble repetitions (i.e., PRACH preamble repetition level) in the second CE level received from the eNB 2 and the value of the "numRepetitionPerRA-Response" IE indicating the number of RA response repetitions (i.e., RAR repetition level) in the second CE level received from the eNB 2 as the conversion factor(s) to obtain values of the "ra-ResponseWindowSize" and "mac-ContentionResolutionTimer" IEs associated with the second CE level. Additionally or alternatively, the MTC UE 1 may use one or both of the value of the IE indicating the repetition level (i.e., the number of repetitions) of the third message (i.e., RRC Connection Request message) in the random access procedure in the second CE level received from the eNB 2 and the value of the IE indicating the repetition level (the number of repetitions) of the fourth message (i.e., Contention Resolution message) in the second CE level received from the eNB 2 as the conversion factor(s) to obtain a value of the "mac-ContentionResolutionTimer" IE associated with the second CE level. In these two examples, the coefficient (proportional coefficient) that associates one or both of the PRACH preamble repetition level and the RAR repetition level with the ra-ResponseWindowSize may be the same as the coefficient (proportional coefficient) that associates one or both of the repetition level of the third message and the repetition level of the fourth message with the mac-ContentionResolutionTimer.

In some implementations, to obtain an IE value corresponding to the necessary CE level in the MTC UE 1, the MTC UE 1 uses another factor in addition to the conversion factor. For example, the MTC UE 1 derives an IE value using the repetition level (i.e., the number of repetitions) of the corresponding signal (e.g., preamble, message) and the conversion factor. For example, the MTC UE 1 may derive the value of the ra-ResponseWindowSize for the second CE level by multiplying the value of the ra-ResponseWindowSize for the first CE level (e.g., CE level 0) by the value of the PRACH preamble repetition level for the second CE level (e.g., CE level 1, 2, or 3) and further multiplying (or adding or dividing) the resulting value by (or to) the value of the conversion factor. In this case, the value of the conversion factor may be a value indicating the interval of two repetitive transmissions of the RACH preamble, or a value indicating the interval between two repetitive transmissions of the RAR message (e.g., M-PDCCH or PDSCH).

Further, when a common conversion factor is used for a plurality of IEs, the MTC UE 1 may derive a value of each IE using the repetition level (i.e., the number of repetitions) of its corresponding signal (i.e., preamble or message) and the common conversion factor. For example, the MTC UE 1 may derive the value of the ra-ResponseWindowSize for the second CE level (e.g., CE level 1, 2, or 3) by multiplying the value of the ra-ResponseWindowSize for the first CE level (e.g., CE level 0) by the value of the PRACH preamble repetition level or the RAR repetition level for the second CE level and further multiplying (or adding or dividing) the resulting value by (or to) the value of the conversion factor. In a similar way, the MTC UE 1 may derive the value of the mac-ContentioResolutionTimer for the second CE level (e.g., CE level 1, 2, or 3) by multiplying the value of the mac-ContentioResolutionTimer for the first CE level (e.g., CE level 0) by one or both of the values of the repetition level of the third message (i.e., RRC Connection Request message) and the repetition level of the fourth message (i.e., Contention Resolution message) for the second CE level and further multiplying (or adding or dividing) the resulting value by the common conversion factor.

In some implementations, the value of the conversion factor may be a CE level value. For example, the value of the conversion factor may be a value (e.g., 1) indicating the CE level (e.g., CE level 1) that is necessary, or may be a value obtained by converting the value indicating the CE level in accordance with a predetermined conversion equation.

In some implementations, the derivation of an IE value(s) using the conversion factor may be performed only for one (or a few) CE levels (e.g., CE level 1) of the plurality of CE levels, and an IE value(s) for the remaining CE level(s) (e.g., CE level 1 and CE level 2) may be derived from the IE value(s) for the one (or a few) CE levels (e.g., CE level 1) in accordance with a predetermined rule. For example, the IE value for CE level 2 may be twice as large as the IE value for CE level 1 and the IE value for CE level 3 may be three times as large as the IE value for CE level 1. Alternatively, the IE value for CE level 2 may be a value obtained by adding "offset+2" to the IE value for CE level 1 and the IE value for CE level 3 may be a value obtained by adding "offset+3" to the IE value for CE level 1. Alternatively, the IE values may be derived using a value corresponding to the difference (e.g., the ratio or the difference) in repetition level (i.e., the number of repetitions) between CE levels. For example, when the repetition level for CE level 1 is 2 and the repetition level for CE level 2 is 4, the IE value for CE level 2 may be set to a value 4/2 times as large as the IE value for CE level 1, i.e., a value twice as large as the IE value for CE level 1.

The above-described first, third, fifth, and seventh examples provide the examples in which one value of the conversion factor is configured (or used) in common for two or more radio resource configuration IEs. On the other hand, the second, fourth, and sixth examples provide the examples in which one value of the conversion factor is configured (or used) in common for two or more CE levels. Alternatively, in some implementations, one value of the conversion factor may be configured (or used) per radio resource configuration IE and per CE level. In this case, the conversion factor is preferably defined in such a manner that the bit length of the IE indicating the conversion factor is smaller than the bit length of the radio resource configuration IE.

Figure 10:
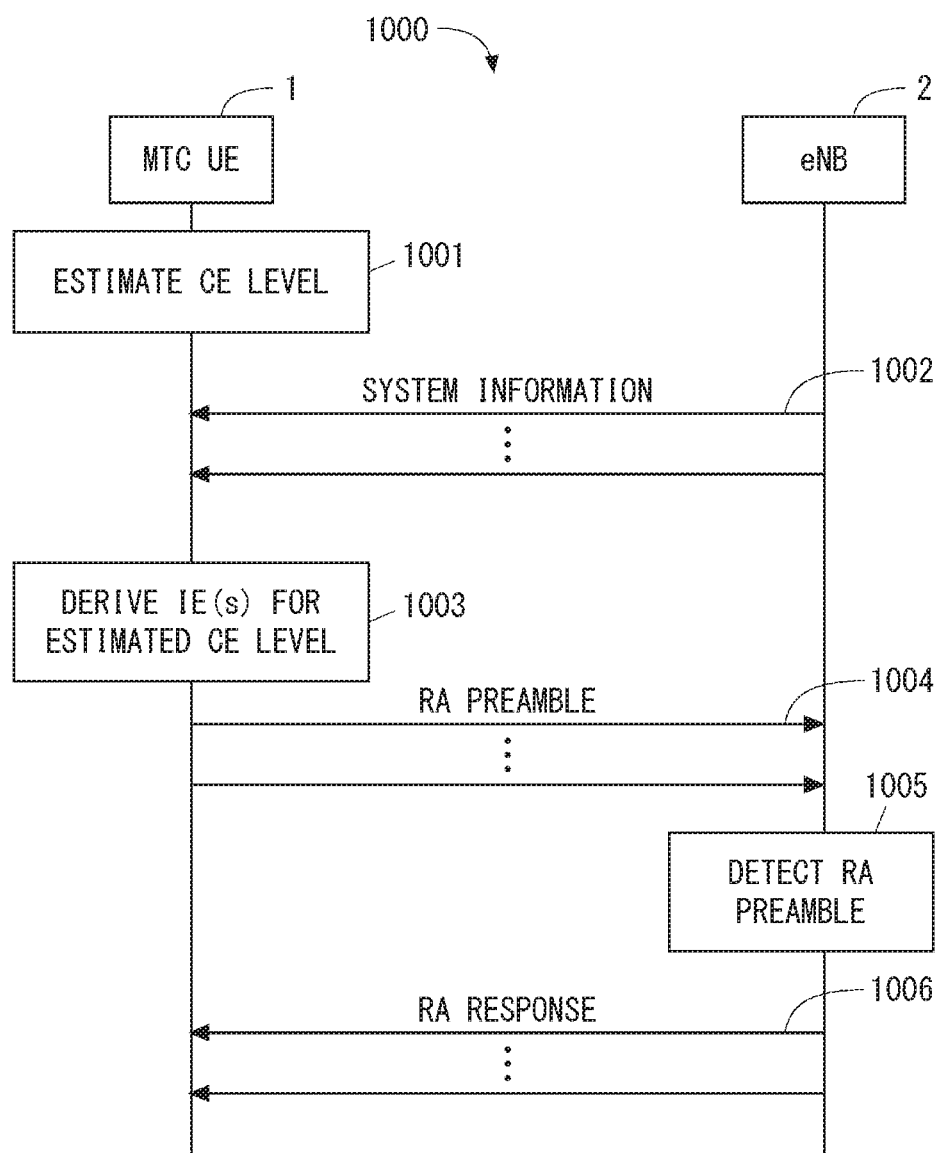
FIG. 10 is a diagram showing an example of a random access procedure according to the first embodiment.

FIG. 10 is a diagram showing an example (Process 1000) of the random access procedure according to this embodiment. In Step 1001, the MTC UE 1 determines (estimates) the CE level that is necessary based on a measured value of reception quality (e.g., RSRP) of a signal from the eNB 2 or a measured value (estimated value) of pathloss between the UE 1 and the eNB 2.

In Step 1002, the MTC UE 1 receives system information (SIB) transmitted from the eNB 2 while using the coverage enhancement technique (e.g., repetitive transmission of the system information (SIB)) corresponding to the determined CE level. This system information contains the base value of the first radio resource configuration IE (e.g., one or more RACH configuration IEs) associated with the normal coverage or the first CE level (e.g., CE level 1) and further contains the information about the conversion factor to derive the value of the first radio resource configuration IE associated with the second CE level (e.g., CE level 2). As already described above, for example, the information about the conversion factor may include the value of the conversion factor itself, or it may be information indirectly indicating the value of the conversion factor or information for deriving the value of the conversion factor.

In Step 1003, the MTC UE 1 converts the base value of the first radio resource configuration IE associated with the normal coverage (or the first CE level) using the value of the conversion factor. The value of the conversion factor can be obtained from the information about the conversion factor received from the eNB 2. The MTC UE 1 thus derives the value of the first radio resource configuration IE associated with the determined CE level.

After that, the MTC UE 1 performs the random access procedure in accordance with the derived value of the first radio resource configuration IE (e.g., one or more RACH configuration IEs) (Steps 1004-1006).

In Step 1004, if the MTC UE 1 has not successfully completed the random access even after the number of RACH preamble attempts reaches the maximum number with respect to the determined (estimated) CE level (e.g., CE level 1), the MTC UE 1 may start RACH preamble transmission using the configuration for the next CE level (e.g., CE level 2). In this case, the MTC UE 1 may derive the configuration for the next CE level (e.g., CE level 2), such as the values of the "ra-ResponseWindowSize" and "mac-ContentionResolutionTimer" IEs, when the applied CE level is changed, or it may collectively derive the values each associated with respective CE levels, in advance.

The MTC UE 1 may start the RA response window, in accordance with the "ra-ResponseWindowSize" IE, at the third subframe subsequent to the beginning or the end of the repetitive transmissions within one RACH preamble transmission attempt in Step 1004. The "ra-ResponseWindowSize" IE indicates the time that the MTC UE 1 should wait for reception of random access response (RAR) in Step 1006 after it has transmitted the RACH preamble in Step 1004. Further, the MTC UE 1 may start the MAC contention resolution timer, in accordance with the "mac-ContentionResolutionTimer" IE, after the beginning or the end of the repetitive third message (Msg3) transmissions in the random access procedure. The "mac-ContentionResolutionTimer" IE indicates the time that the MTC UE 1 should wait for reception of a Contention Resolution message (check of the content) after it has transmitted the third message (Msg3).

In Step 1005, the eNB 2 detects the random access (RA) preamble (i.e., RACH preamble) transmitted from the MTC UE 1. For example, the eNB 2 determines the CE level of the MTC UE 1 based on the radio resource on which the RA preamble has been detected. Then the eNB 2 performs an operation for the coverage enhancement, including the repetitive reception of the RA preamble and the repetitive transmission of the RA response, in accordance with the values of a plurality of IEs (e.g., "numRepetitionPerPreambleAttempt" and "ra-ResponseWindowSize" IE) corresponding to the CE level determined for the MTC UE 1. In some implementations, the eNB 2 may calculate the values of the plurality of IEs corresponding to the CE level determined for the MTC UE 1 based on the value of the conversion factor for this CE level. In some other implementations, the eNB 2 may calculate the values of the plurality of IEs corresponding to the CE level determined for the MTC UE 1 by referring to a lookup table that stores the values of each IE corresponding to respective CE levels.

The above-described specific example provides methods of deriving values, each associated with respective CE levels, of an existing radio parameter regarding the random access procedure (i.e., an IE in RRC messages). In a similar way, the above-described deriving method may be used to derive values, each associated with respective CE levels, of a radio parameter (i.e., an IE in RRC messages) that is newly defined for the coverage enhancement technique. For example, the above-described deriving methods may be applied to the IE indicating the maximum number of RACH preamble attempts per CE level (i.e., maxNumPreambleAttemptCE) and the IE indicating the maximum number of repetitions per RACH preamble attempt (i.e., numRepetitionPerPreambleAttempt). In this case, the eNB 2 may transmit the IE values corresponding to the lowest CE level (e.g., CE level 1) by the system information, and the UE 1 may derive the IE values corresponding to one or more higher CE levels (e.g., CE level 2 or a CE level higher than CE level 2) using the above-described conversion factor.

The above-described random access procedure may be applied not only to an initial access when the UE is switched from the RRC_IDLE state to the RRC_CONNECTED state but also to a random access in the RRC_CONNECTED state. Further, when a random access is performed in response to an instruction (i.e., PDCCH Order) from the eNB 2, this instruction may include at least one of the base value and the conversion factor.

Figure 11:
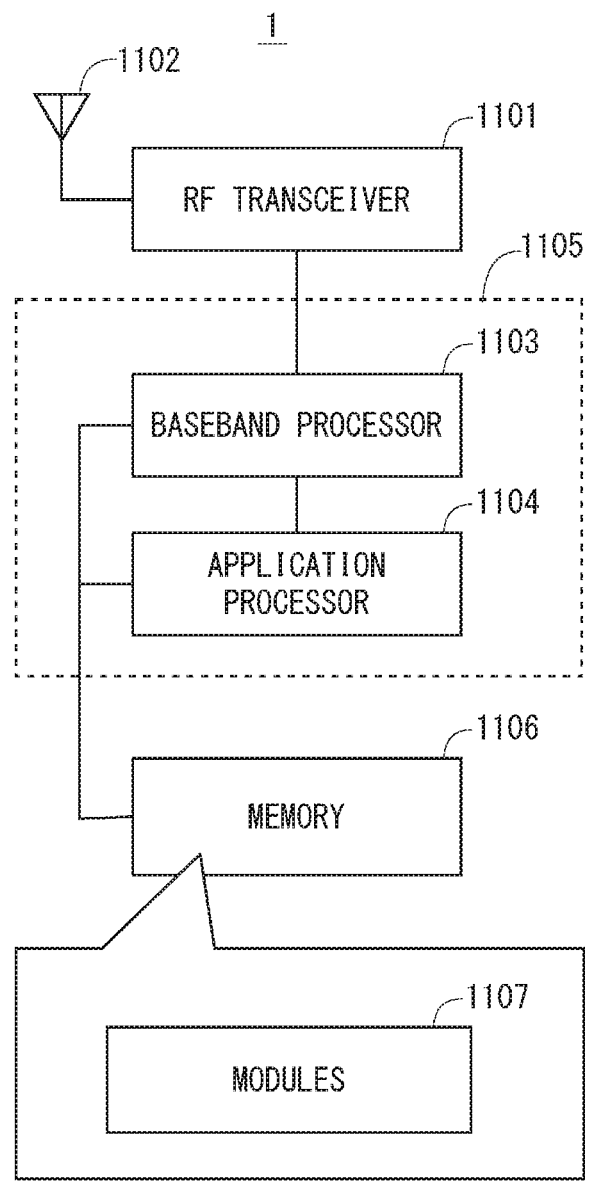
FIG. 11 is a block diagram showing a configuration example of a radio terminal according to the several embodiments.

The following provides configuration examples of the MTC UE 1 and the eNB 2 according to this embodiment. FIG. 11 is a block diagram showing a configuration example of the MTC UE 1. A Radio Frequency (RF) transceiver 1101 performs analog RF signal processing to communicate with the eNB 2. The analog RF signal processing performed by the RF transceiver 1101 includes frequency up-conversion, frequency down-conversion, and amplification. The RF transceiver 1101 is coupled to an antenna 1102 and a baseband processor 1103. That is, the RF transceiver 1101 receives modulated symbol data (or OFDM symbol data) from the baseband processor 1103, generates a transmission RF signal, and supplies the transmission RF signal to the antenna 1102. Further, the RF transceiver 1101 generates a baseband reception signal based on a reception RF signal received by the antenna 1102, and supplies the baseband reception signal to the baseband processor 1103.

The baseband processor 1103 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and packet communication).

In the case of LTE and LTE-Advanced, for example, the digital baseband signal processing performed by the baseband processor 1103 may include signal processing of a Packet Data Convergence Protocol (PDCP) layer, a Radio Link Control (RLC) layer, the MAC layer, and the PHY layer. Further, the control plane processing performed by the baseband processor 1103 may include processing of a Non-Access Stratum (NAS) protocol, an RRC protocol, and MAC CEs.

The baseband processor 1103 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control plane processing. In this case, the protocol stack processor, which performs the control plane processing, may be integrated with an application processor 1104 described in the following.

The application processor 1104 is also referred to as a CPU, an MPU, a microprocessor, or a processor core. The application processor 1104 may include a plurality of processors (processor cores). The application processor 1104 executes a system software program (Operating System (OS)) and various application programs (e.g., communication application to acquire metering data or sensing data) loaded from a memory 1106 or from another memory (not shown), thereby providing various functions of the MTC UE 1.

In some implementations, as represented by a dashed line (1105) in FIG. 11, the baseband processor 1103 and the application processor 1104 may be integrated on a single chip. In other words, the baseband processor 1103 and the application processor 1104 may be implemented in a single System on Chip (SoC) device 1105. An SoC device may be referred to as a system Large Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include an internal memory device that is integrated in the baseband processor 1103, the application processor 1104, or the SoC 1105. Further, the memory 1106 may include a memory in a Universal Integrated Circuit Card (UICC).

The memory 1106 may store one or more software modules (computer programs) 1107 including instructions and data to perform processing by the MTC UE 1 described in the above embodiments. In some implementations, the baseband processor 1103 or the application processor 1104 may load the software modules 1107 from the memory 1106 and execute the loaded software modules, thereby performing the processing of the MTC UE 1 described in the above embodiments.

Figure 12:
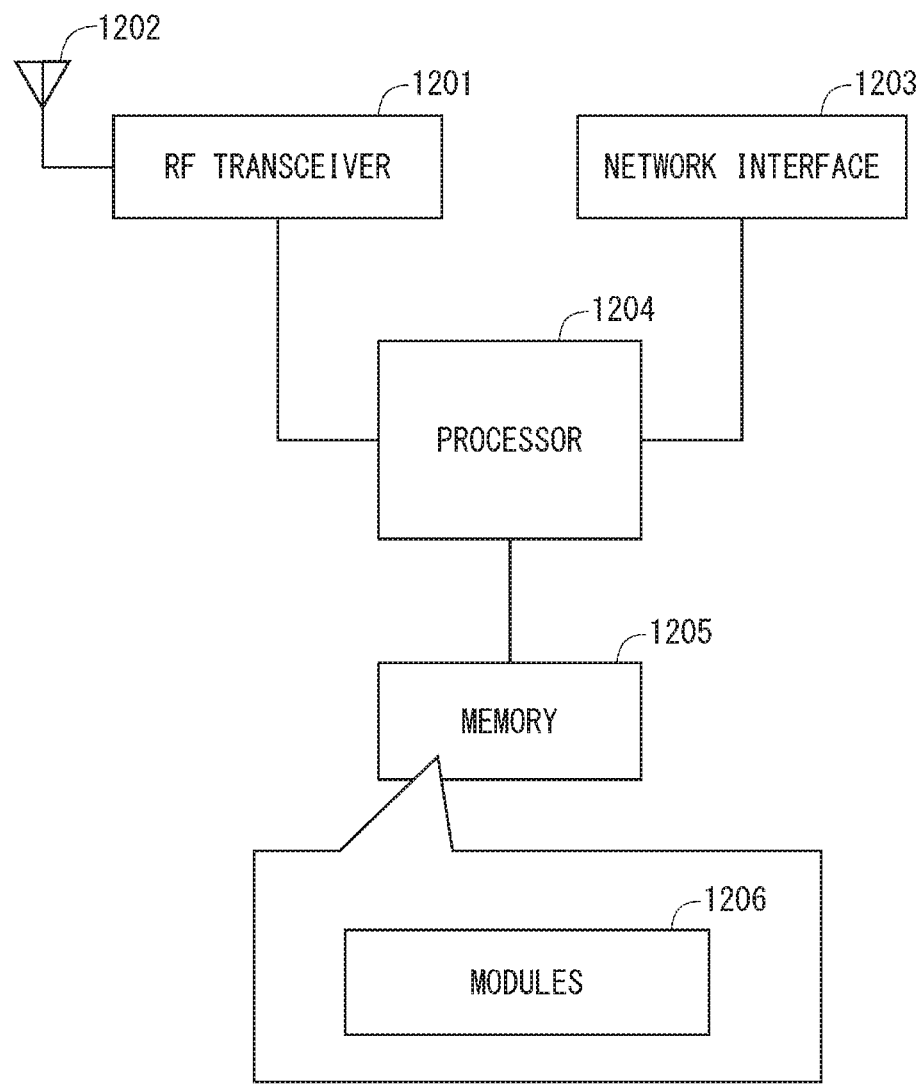
FIG. 12 is a block diagram showing a configuration example of a base station according to the several embodiments.

FIG. 12 is a block diagram showing a configuration example of the base station (eNB) 2 according to the above-described embodiments. Referring to FIG. 12, the eNB 2 includes an RF transceiver 1201, a network interface 1203, a processor 1204, and a memory 1205. The RF transceiver 1201 performs analog RF signal processing to communicate with the radio terminal 1. The RF transceiver 1201 may include a plurality of transceivers. The RF transceiver 1201 is coupled to an antenna 1202 and the processor 1204. The RF transceiver 1201 receives modulated symbol data (or OFDM symbol data) from the processor 1204, generates a transmission RF signal, and supplies the transmission RF signal to the antenna 1202. Further, the RF transceiver 1201 generates a baseband reception signal based on a reception RF signal received by the antenna 1202 and supplies the baseband reception signal to the processor 1204.

The network interface 1203 is used to communicate with the network node (e.g., Mobility Management Entity (MME) and Serving Gateway (S-GW)). The network interface 1203 may include, for example, a network interface card (NIC) conforming to the IEEE 802.3 series.

The processor 1204 performs digital baseband signal processing (data plane processing) and control plane processing for radio communication. In the case of LTE and LTE-Advanced, for example, the digital baseband signal processing performed by the processor 1204 may include signal processing of a PDCP layer, an RLC layer, a MAC layer, and a PHY layer. Further, the control plane processing performed by the processor 1204 may include processing of an S1 protocol, an RRC protocol, and MAC CEs.

The processor 1204 may include a plurality of processors. The processor 1204 may include, for example, a modem processor (e.g., a DSP) that performs the digital baseband signal processing and a protocol stack processor (e.g., a CPU or an MPU) that performs the control plane processing.

The memory 1205 is composed of a combination of a volatile memory and a non-volatile memory. The volatile memory is, for example, an SRAM, a DRAM, or a combination thereof. The non-volatile memory is, for example, an MROM, a PROM, a flash memory, a hard disc drive, or any combination thereof. The memory 1205 may include a storage that is located away from the processor 1204. In this case, the processor 1204 may access the memory 1205 via the network interface 1203 or an I/O interface (not shown).

The memory 1205 may store software modules (computer programs) 1206 including instructions and data to perform the processing by the eNB 2 described in the above embodiments. In some implementations, the processor 1204 may load the software modules 1206 from the memory 1205 and execute the loaded software modules, thereby performing the processing of the eNB 2 described in the above embodiments.

As described above with reference to FIGS. 11 and 12, each of the processors included in the MTC UE 1 and the eNB 2 according to the above-described embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The above embodiments have been described with regard to radio resource configuration IEs regarding random access (e.g., RACH configuration IE and PRACH configuration IE). However, the methods of deriving a IE value for a specific CE level using the conversion factor described in the above embodiments may be widely used for other applications in which different radio resource configurations for different coverage enhancement (CE) levels are required. The methods described in the above embodiments may be used, for example, to derive values of radio resource configuration IEs (e.g., the number of repetitions of transmission (or reception)) required when the MTC UE 1 in the RRC_CONNECTED state performs UL user data transmission on PUSCH, transmission of L1/L2 control information on PUCCH, reception of system information or DL user data on PDSCH, and reception of L1/L2 control information on M-PDCCH, using a specific CE level.

The above embodiments have been described with regard to the case in which the eNB 2 transmits the information about the conversion factor by the system information. However, the information about the conversion factor may be transmitted by a signal (e.g., RRC signaling, MAC signaling) that is used the eNB 2 to transmit dedicated control information to the MTC UE 1. For example, the information about the conversion factor may be transmitted from the eNB 2 to the MTC UE 1 by an RRC Connection Reconfiguration message or a MAC Control Element. When the MTC UE 1 has received the information about the conversion factor in both the system information and the dedicated control information, the MTC UE 1 may preferentially use the value of the conversion factor obtained from the information about the conversion factor received in the dedicated control information (i.e., overwrite the value of the conversion factor obtained from the system information by that obtained from the dedicated control information).

The operations of the MTC UE 1 and the eNB 2 regarding the derivation of IE values using the conversion factor, described in the above embodiments, may be used to derive values of a timer that uses different timer lengths depending on the coverage enhancement (CE) level. Specific examples of a timer that uses different timer values for different CE levels include, for example, (1) a timer associated with control (i.e., RRC, NAS) of call processing etc., (2) a timer associated with Layer 2 (i.e., PDCP, RLC, MAC) control, and (3) a timer used in the RRC_IDLE state.

For example, the aforementioned timer (1) may be a timer (i.e., timer T300) that is used to determine success or failure of an RRC connection establishment. The MTC UE 1 starts the timer (i.e., the timer T300) upon transmitting an RRC Connection Reestablishment Request message and stops the timer upon receiving a response from the eNB 2 (i.e., RRC Connection Setup message or RRC Connection Reject message).

Additionally or alternatively, the aforementioned timer (1) may be a timer (i.e., timer T311) that is used to determine success or failure of detection of a suitable cell. The MTC UE 1 starts the timer (i.e., timer T311) upon starting an RRC Connection Reestablishment procedure and stops the timer upon detecting (or selecting) a suitable cell.

Additionally or alternatively, the aforementioned timer (1) may be a timer (i.e., timer T304) that is used to determine success or failure of a handover. The MTC UE 1 starts the timer (i.e., timer T304) upon receiving an RRC Connection Reconfiguration message including a MobilityControlInfo IE (that is, the message that instructs the handover) and stops the timer upon successfully completing a random access procedure to the target cell.

For example, the aforementioned timer (2) may be a timer that is used for control in the MAC layer. Specific examples of the timer used for control in the MAC layer include: timers (e.g., OnDurationTimer, drx-InactivityTimer, drx-RetransmissionTimer, HART RTT Timer) related to discontinuous reception control (Discontinuous Reception (DRX)) in a UE; timers (e.g., sr-ProhibitTimer, logicalChannelSR-ProhibitTimer) for measuring a period of time during which transmission of Scheduling Requests (SRs) is prohibited; a timer (e.g., PeriodicBSR-Timer, RetxBSR-Timer) related to reporting of an uplink buffer amount (i.e., Buffer Status Report (BSR)), and a timer (e.g., periodicPHR-Timer, prohibitPHR-Timer) related to reporting of the remaining amount of uplink transmission power (Power Headroom Report (PHR)).

Additionally or alternatively, the aforementioned timer (2) may be a timer that is used for control in the RLC layer. Specific examples of the timer used for control in the RLC layer include a timer (e.g., T-Reordering) used to detect loss of RLC PDUs and to perform order control in DL data reception, and a timer (e.g., T-StatusProhibit) for measuring a period of time during which transmission of information about the status of DL data reception (i.e., STATUS PDUs) is prohibited.

Additionally or alternatively, the aforementioned timer (2) may be a timer used for control in the PDCP layer. Specific examples of the timer used for control in the PDCP layer include a timer (e.g., discardTimer) for determining whether to discard pending data in the UL data transmission.

For example, the aforementioned timer (3) may be a timer used in a cell reselection process performed by the MTC UE 1 in the RRC_IDLE state. Specifically, the aforementioned timer (3) may be a timer for measuring a duration of time during which a condition to trigger the cell reselection is satisfied (i.e., T-Reselection).

The above-described timers may be started from the first or last transmission of a repetitive transmission of a signal (or message) that relates to (or serves as a trigger for) the respective timers. Alternatively, these timers may be started from the first or last transmission of a repetitive reception of a signal (message) that relates to (or serves as a trigger for) the respective timers.

In the above-described embodiments, the radio terminal 1 may be a non-MTC UE. That is, the above-described embodiments may be broadly applied to communication between a UE and an eNB that support the coverage enhancement technique including repetitive transmission (or reception).

Further, the above-described embodiments may be applied not only to LTE, LTE-Advanced and modifications thereof but also to communication between the radio terminal and the base station that support the coverage enhancement technique in other radio communication networks or systems.

For example, the above-described embodiments may be applied to the coverage enhancement technique in the system called Narrow Band-Internet of Things (NB-IoT), which has been discussed in the 3GPP. NB-IoT aims to accommodate IoT devices having characteristics of low cost and ultra-low power consumption (e.g., terminals can operate for ten years without exchanging their batteries) in the cellular network. The objects and the characteristics of devices in NB-IoT are extremely similar to those in Rel-13 MTC, and it has been discussed to reuse the 3GPP Release 13 (Rel-13) MTC technologies for NB-IoT. Accordingly, the above-described embodiments may be applied to NB-IoT. While a Rel-13 MTC UE transmits a RACH preamble in random access, it has been discussed that a NB-IoT UE transmits a message (e.g., contention-based message), in place of a preamble, on a PRACH. As described above, while it has been discussed to modify Rel-13 MTCs for NB-IoT or introduce new functions into NB-IoT, the above-described embodiments may be applied to NB-IoT regardless of differences between them.

Further, the above-described embodiments are merely examples regarding application of the technical ideas obtained by the present inventor. Needless to say, these technical ideas are not limited to the above-described embodiments and various modifications can be made thereto.

For example, the whole or part of the above embodiments can be described as, but not limited to, the following supplementary notes.

(Supplementary Note A1)

A base station comprising:

a memory; and at least one processor coupled to the memory and configured to transmit to a radio terminal a first value of a first radio resource configuration information element and information about a conversion factor, the first value being associated with normal coverage or with a first coverage enhancement level, wherein a value of the conversion factor obtained from the information about the conversion factor is used by the radio terminal to derive a second value of the first radio resource configuration information element, the second value being associated with a second coverage enhancement level.

(Supplementary Note A2)

The base station according to Supplementary Note A1, wherein the first radio resource configuration information element comprises two or more radio resource configuration information elements, the second value comprises two or more values of the two or more radio resource configuration information elements, the two or more values being associated with the second coverage enhancement level, and the value of the conversion factor is used by the radio terminal to derive each of the two or more values from the first value.

(Supplementary Note A3)

The base station according to Supplementary Note A1, wherein the value of the conversion factor is used by the radio terminal to derive, in addition to the second value, a third value of the first radio resource configuration information element from the first value, the third value being associated with a third coverage enhancement level.

(Supplementary Note A4)

The base station according to Supplementary Note A3, wherein the value of the conversion factor directly or indirectly specifies scaling factors among the first, second, and third values.

(Supplementary Note A5)

The base station according to any one of Supplementary Notes A1 to A4, wherein the value of the conversion factor comprises a value of a multiplier factor, and the second value is calculated by multiplying the first value by the value of the multiplier factor.

(Supplementary Note A6)

The base station according to any one of Supplementary Notes A1 to A4, wherein the value of the conversion factor comprises an offset value, and the second value is calculated by adding the offset value to the first value.

(Supplementary Note A7)

The base station according to any one of Supplementary Notes A1 to A4, wherein the value of the conversion factor is also used to derive a value of a second radio resource configuration information element different from the first radio resource configuration information element, the value of the second radio resource configuration information element being associated with the second coverage enhancement level.

(Supplementary Note A8)

The base station according to any one of Supplementary Notes A1 to A7, wherein the first radio resource configuration information element comprises at least one parameter regarding a random access procedure, and the at least one parameter comprises at least one of: (a) a parameter that defines frequency and time resources available for transmission of a random access preamble; (b) a parameter indicating the total number of random access preambles; (c) a parameter indicating the maximum number of attempts of a random access preamble; (d) the number of repetitions of random access preamble transmission for each transmission attempt of a random access preamble; (e) a parameter indicating a duration of a random access response window; (f) a parameter indicating a duration of a contention resolution timer; (g) the maximum number of repetitions of random access response transmission by the base station; and (h) a parameter indicating the maximum number of re-transmissions of a third message responsive to reception of a random access response.

(Supplementary Note A9)

The base station according to any one of Supplementary Notes A1 to A8, wherein the at least one processor is further configured to:

calculate the value of the conversion factor to be transmitted to the radio terminal using the first and second values; and transmit the calculated value of the conversion factor to the radio terminal.

(Supplementary Note B1)

A radio terminal comprising:

a memory; and at least one processor coupled to the memory and configured to execute at least one module comprising:

a reception module configured to receive from a base station a first value of a first radio resource configuration information element, the first value being associated with normal coverage or a first coverage enhancement level; and a calculation module configured to derive a second value of the first radio resource configuration information element by converting the first value using a value of a conversion factor, the second value being associated with a second coverage enhancement level.

(Supplementary Note B2)

The radio terminal according to Supplementary Note B1, wherein the first radio resource configuration information element comprises two or more radio resource configuration information elements, the second value comprises two or more values of the two or more radio resource configuration information elements, the two or more values being associated with the second coverage enhancement level, and the calculation module is configured to use the value of the conversion factor to derive each of the two or more values from the first value.

(Supplementary Note B3)

The radio terminal according to Supplementary Note B1, wherein the calculation module is configured to use the value of the conversion factor to derive, in addition to the second value, a third value of the first radio resource configuration information element from the first value, the third value being associated with a third coverage enhancement level.

(Supplementary Note B4)

The radio terminal according to Supplementary Note B3, wherein the value of the conversion factor directly or indirectly specifies scaling factors among the first, second, and third values.

(Supplementary Note B5)

The radio terminal according to any one of Supplementary Notes B1 to B4, wherein the at least one processor is further configured to receive, from the base station, information about the conversion factor to obtain the value of the conversion factor.

(Supplementary Note B6)

The radio terminal according to any one of Supplementary Notes B1 to B5, wherein the value of the conversion factor comprises a value of a multiplier factor, and the second value is calculated by multiplying the first value by the value of the multiplier factor.

(Supplementary Note B7)

The radio terminal according to any one of Supplementary Notes B1 to B5, wherein the value of the conversion factor comprises an offset value, and the second value is calculated by adding the offset value to the first value.

(Supplementary Note B8)

The radio terminal according to Supplementary Note B5, wherein the value of the conversion factor is also used to derive a value of a second radio resource configuration information element different from the first radio resource configuration information element, the value of the second radio resource configuration information element being associated with the second coverage enhancement level.

(Supplementary Note B9)

The radio terminal according to any one of Supplementary Notes B1 to B8, wherein the at least one module further comprises:

an estimation module configured to estimate a coverage enhancement level with which the radio terminal should comply; and a communication module configured to communicate with the base station in accordance with the value of the first radio resource configuration information element associated with the estimated coverage enhancement level, and the calculation module is configured to calculate the second value as the value of the first radio resource configuration information element associated with the estimated coverage enhancement level.

(Supplementary Note B10)

The radio terminal according to any one of Supplementary Notes B1 to B9, wherein the first radio resource configuration information element comprises at least one parameter regarding a random access procedure, and the at least one parameter comprises at least one of: (a) a parameter that defines frequency and time resources available for transmission of a random access preamble; (b) a parameter indicating the total number of random access preambles; (c) a parameter indicating the maximum number of attempts of a random access preamble; (d) the number of repetitions of random access preamble transmission for each transmission attempt of a random access preamble; (e) a parameter indicating a duration of a random access response window; (f) a parameter indicating a duration of a contention resolution timer; (g) the maximum number of repetitions of random access response transmission by the base station; and (h) a parameter indicating the maximum number of re-transmissions of a third message responsive to reception of a random access response.

This application is based upon and claims the benefit of priority from Japanese Patent Application No. 2015-217963, filed on Nov. 5, 2015, the disclosure of which is incorporated herein in its entirety by reference.

REFERENCE SIGNS LIST

1 RADIO TERMINAL (UE)
2 BASE STATION (eNB)
1101 RADIO FREQUENCY (RF) TRANSCEIVER
1103 BASEBAND PROCESSOR
1104 APPLICATION PROCESSOR
1106 MEMORY
1201 RF TRANSCEIVER
1204 PROCESSOR
1205 MEMORY

The invention claimed is:

1. A base station comprising:
a memory; and
at least one processor coupled to the memory and configured to:
broadcast system information, the system information including a first base value of a random access response window size, a second base value of a Medium Access Control (MAC) contention resolution timer, and multiplier factors corresponding to respective coverage enhancement levels;
receive a random access preamble, from a User Equipment (UE) which performs radio communication according to Narrow Band-Internet of Things (NB-IoT) corresponding to a coverage enhancement level that is determined by the UE according to Reference Signals Received Power (RSRP) measured by the UE;
control transmission of a random access response message based on duration of the random access response window size that is derived by multiplying the first base value of the random access response window size with a multiplier factor corresponding to the coverage enhancement level of the UE; and
control transmission of a MAC contention resolution message based on duration indicated by a timer value of the MAC contention resolution timer that is derived by multiplying the second base value of the MAC contention resolution timer with the multiplier factor corresponding to the coverage enhancement level,
wherein the multiplier factors are values of an information element of a radio resource configuration that is different from the random access response window size and from the MAC contention resolution timer,
wherein the values of the information element are used for indicating a number of repetitions for third and fourth messages of a random access procedure, and
wherein the fourth message is the MAC contention resolution message.

2. A method in a base station, the method comprising:
broadcasting system information, the system information including a first base value of a random access response window size, a second base value of a Medium Access Control (MAC) contention resolution timer, and multiplier factors corresponding to respective coverage enhancement levels;
receiving a random access preamble, from a User Equipment (UE) which performs radio communication according to Narrow Band-Internet of Things (NB-IoT) corresponding to a coverage enhancement level that is determined by the UE according to Reference Signals Received Power (RSRP) measured by the UE;
controlling transmission of a random access response message based on duration of the random access response window size that is derived by multiplying the first base value of the random access response window size with a multiplier factor corresponding to the coverage enhancement level of the UE; and
controlling transmission of a MAC contention resolution message based on duration indicated by a timer value of the MAC contention resolution timer that is derived by multiplying the second base value of the MAC contention resolution timer with the multiplier factor corresponding to the coverage enhancement level,
wherein the multiplier factors are values of an information element of a radio resource configuration that is different from the random access response window size and from the MAC contention resolution timer,
wherein the values of the information element are used for indicating a number of repetitions for third and fourth messages of a random access procedure, and
wherein the fourth message is the MAC contention resolution message.

3. A non-transitory computer readable medium storing a program for causing a computer to perform a method in a base station, wherein the method comprises:
broadcasting system information, the system information including a first base value of a random access response window size, a second base value of a Medium Access Control (MAC) contention resolution timer, and multiplier factors corresponding to respective coverage enhancement levels;
receiving a random access preamble, from a User Equipment (UE) which performs radio communication according to Narrow Band-Internet of Things (NB-IoT) corresponding to a coverage enhancement level that is determined by the UE according to Reference Signals Received Power (RSRP) measured by the UE;
controlling transmission of a random access response message based on duration of the random access response window size that is derived by multiplying the first base value of the random access response window size with a multiplier factor corresponding to the coverage enhancement level of the UE; and
controlling transmission of a MAC contention resolution message based on duration indicated by a timer value of the MAC contention resolution timer that is derived by multiplying the second base value of the MAC contention resolution timer with the multiplier factor corresponding to the coverage enhancement level,
wherein the multiplier factors are values of an information element of a radio resource configuration that is different from the random access response window size and from the MAC contention resolution timer,
wherein the values of the information element are used for indicating a number of repetitions for third and fourth messages of a random access procedure, and
wherein the fourth message is the MAC contention resolution message.

4. A User Equipment (UE) configured to perform radio communication according to Narrow Band-Internet of Things (NB-IoT), the UE comprising:

a memory; and at least one processor coupled to the memory and configured to:

receive system information, the system information including a first base value of a random access response window size, a second base value of a Medium Access Control (MAC) contention resolution timer, and multiplier factors corresponding to respective coverage enhancement levels;

determine a coverage enhancement level of the UE according to Reference Signals Received Power (RSRP) measured by the UE;

derive duration of the random access response window size by multiplying the first base value of the random access response window size with a multiplier factor corresponding to the determined coverage enhancement level;

derive a timer value of the MAC contention resolution timer by multiplying the second base value of the MAC contention resolution timer with the multiplier factor corresponding to the determined coverage enhancement level;

receive a random access response message during the derived duration of the random access response window size; and receive a MAC contention resolution message during duration indicated by the derived timer value of the MAC contention resolution timer, wherein the multiplier factors are values of an information element of a radio resource configuration that is different from the random access response window size and from the MAC contention resolution timer, wherein the values of the information element are used for indicating a number of repetitions for third and fourth messages of a random access procedure, and wherein the fourth message is the MAC contention resolution message.

5. A method in a User Equipment (UE) performing radio communication according to Narrow Band-Internet of Things (NB-IoT), the method comprising:

receiving system information, the system information including a first base value of a random access response window size, a second base value of a Medium Access Control (MAC) contention resolution timer, and multiplier factors corresponding to respective coverage enhancement levels;

determining a coverage enhancement level of the UE according to Reference Signals Received Power (RSRP) measured by the UE;

deriving duration of the random access response window size by multiplying the first base value of the random access response window size with a multiplier factor corresponding to the determined coverage enhancement level deriving a timer value of the MAC contention resolution timer by multiplying the second base value of the MAC contention resolution timer with the multiplier factor corresponding to the determined coverage enhancement level;

receiving a random access response message during the derived duration of the random access response window size; and receiving a MAC contention resolution message during duration indicated by the derived timer value of the MAC contention resolution timer, wherein the multiplier factors are values of an information element of a radio resource configuration that is different from the random access response window size and from the MAC contention resolution timer, wherein the values of the information element are used for indicating a number of repetitions for third and fourth messages of a random access procedure, and wherein the fourth message is the MAC contention resolution message.

6. A non-transitory computer readable medium storing a program for causing a computer to perform a method in a User Equipment (UE) performing radio communication according to Narrow Band-Internet of Things (NB-IoT), wherein the method comprises:

receiving system information, the system information including a first base value of a random access response window size, a second base value of a Medium Access Control (MAC) contention resolution timer, and multiplier factors corresponding to respective coverage enhancement levels;

determining a coverage enhancement level of the UE according to Reference Signals Received Power (RSRP) measured by the UE;

deriving duration of the random access response window size by multiplying the first base value of the random access response window size with a multiplier factor corresponding to the determined coverage enhancement level;

deriving a timer value of the MAC contention resolution timer by multiplying the second base value of the MAC contention resolution timer with the multiplier factor corresponding to the determined coverage enhancement level;

receiving a random access response message during the derived duration of the random access response window size; and receiving a MAC contention resolution message during duration indicated by the derived timer value of the MAC contention resolution timer, wherein the multiplier factors are values of an information element of a radio resource configuration that is different from the random access response window size and from the MAC contention resolution timer, wherein the values of the information element are used for indicating a number of repetitions for third and fourth messages of a random access procedure, and wherein the fourth message is the MAC contention resolution message.

* * * * *